US012538057B2

(12) United States Patent
Potts

(10) Patent No.: US 12,538,057 B2
(45) Date of Patent: Jan. 27, 2026

(54) MOBILE SOUND SYSTEM

(71) Applicant: Jeffrey Potts, American Fork, UT (US)

(72) Inventor: Jeffrey Potts, American Fork, UT (US)

( * ) Notice: Subject to any disclaimer, the term of this patent is extended or adjusted under 35 U.S.C. 154(b) by 183 days.

(21) Appl. No.: 18/436,205

(22) Filed: Feb. 8, 2024

(65) Prior Publication Data

US 2025/0260918 A1 Aug. 14, 2025

(51) Int. Cl.
*H04R 1/02* (2006.01)
*H04R 3/00* (2006.01)

(52) U.S. Cl.
CPC ............ *H04R 1/026* (2013.01); *H04R 1/028* (2013.01); *H04R 3/00* (2013.01); *H04R 2420/07* (2013.01)

(58) Field of Classification Search
CPC .......... H04R 1/026; H04R 1/028; H04R 3/00; H04R 2420/07
See application file for complete search history.

(56) References Cited

U.S. PATENT DOCUMENTS 4,438,482 A 3/1984 Leon et al.
4,824,139 A 4/1989 Robbins
5,771,305 A * 6/1998 Davis ...................... B62J 45/10 224/463
10,864,429 B2 12/2020 Dreifus
11,745,085 B1 9/2023 Potts
2004/0100792 A1 5/2004 Trzecieski
2005/0160902 A1 7/2005 Iwai et al.
2006/0008104 A1 1/2006 Sausser
2008/0150255 A1 6/2008 Hogenmiller et al.
2012/0039483 A1 2/2012 Burke et al.

FOREIGN PATENT DOCUMENTS

CA 2823445 2/2014

* cited by examiner

*Primary Examiner* — Andrew Sniezek
(74) *Attorney, Agent, or Firm* — Thorpe North & Western, LLP

(57) ABSTRACT

A personal, mobile sound system comprises a personal, mobile, outdoor, recreational sport platform capable of transporting a rider and having a flat surface. A mount is fixed to the flat surface of the sport platform and exposed to ambient conditions. The mount comprises a mount plate, a spacer plate and an adhesive mount layer on the bottom of the spacer plate. Slots are located in the mount plate to receive straps. The spacer plate has a length less than a length of the mount plate to form a pair of spaced-apart notches. The spacer plate has a thickness creating a thickness of the pair of spaced-apart notches at least as great as a thickness of the first and second straps. A self-powered, wireless speaker is releasably coupled to the mount.

20 Claims, 8 Drawing Sheets

MOBILE SOUND SYSTEM

BACKGROUND

Outdoor sports and recreation, such as downhill snow skiing and snowboarding, cycling, mountain biking, surfing, etc., are popular. It can be desirable to listen to music while participating in such sports and recreation.

Earbuds, earphones or headphones can be worn to listen to music while being active. Some can be wireless and can receive a wireless radio signal from a remote music player or cellular phone. Earbuds or headphones can come loose during activities; and can be difficult to find in the terrain, such as the snow, bushes or water. Some can be wired and can have a wire that can become tangled in equipment while active. In addition, hearing a talking to companions can be difficult with earbuds or earphones in the ear. Improvement to audio while sporting is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
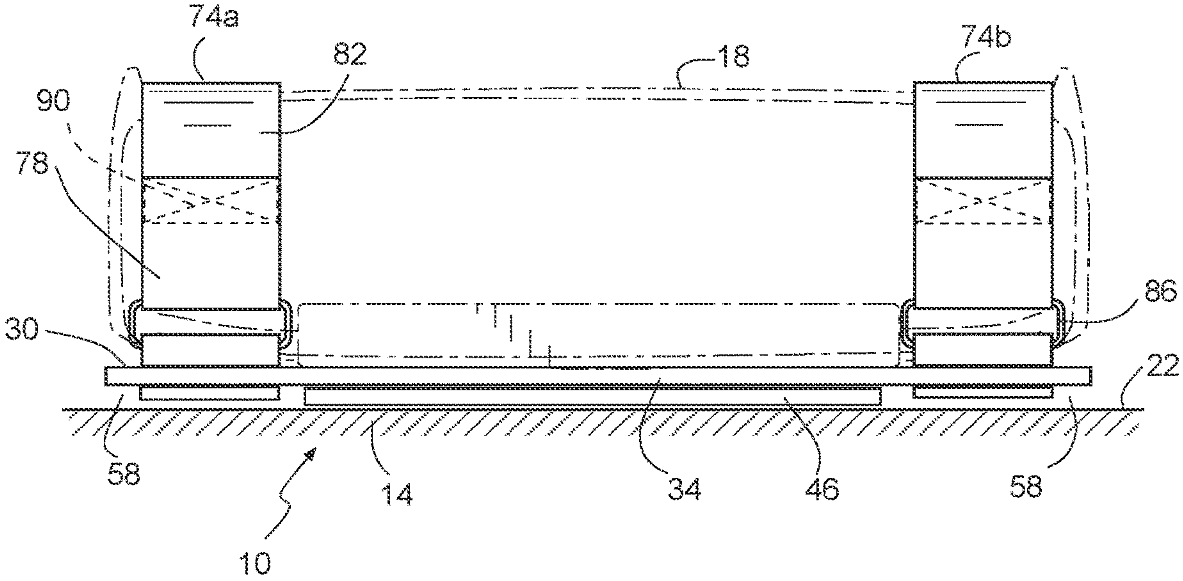
FIG. 1 is a side view of an example of a personal, mobile sound system, in accordance with one embodiment, shown with a wireless speaker in phantom lines and shown mounted to a cross-sectional schematic view of an example of a personal, mobile, outdoor recreational sport platform capable of transporting a rider.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

A personal, mobile sound system and one or more mounts are provided for mounting one or more self-powered, wireless speakers to one or more flat surfaces of a personal, mobile, outdoor, recreational sport platform capable of transporting a rider. In one aspect, the rider can be a single rider and the recreational sport platform can accommodate a single rider. In another aspect, the rider can be active in physically powering, steering, balancing and/or controlling the recreational sport platform. In another aspect, the recreational sport platform can be human-powered. In another aspect, the recreational sport platform can be non-powered and can rely on gravity and a low-friction interface for movement of the platform and the rider. In another aspect, the rider can be releasably attached to the recreational sport platform, such as through bindings. In another aspect, the recreational sport platform can have a powered-assist, such as an electric motor powered by a rechargeable battery. In another aspect, the recreational sport platform can be powered by a motor, such as an electric motor powered by a rechargeable battery. In another aspect, the flat surface of the recreational sport platform can be exposed to the elements or ambient conditions, e.g. such as an exterior surface that faces outward and/or a weather resistant surface designed to be exposed to direct sunlight and/or moisture.

The speaker can be mobile and capable of independent operation with a rechargeable battery for power. The speaker can also have a receiver or transceiver for receiving a wireless signal with music from a music source, such as a cellular phone. In one aspect, the source or cellular phone can be paired with the speaker and can exchange data over a short range, e.g. up to 10 meters, with limited power, e.g. 2.5 kilowatts. For example, the source or the cellular phone and the speaker can utilize the Bluetooth® short-range wireless technology standard. In another aspect, the speaker can be waterproof or water resistant for outdoor use and/or on the water. In another aspect, the speaker can have an elongated shape with a general or substantial cylindrical cross-section. The cross-section can be perpendicular to a longitudinal axis of the speaker and can be substantially circular or square with rounded corners.

The mount can be fixed to the flat surface of the recreational sport platform, and can removably receive the speaker. The speaker can be releasably coupled to the recreational sport platform. Thus, the sound system can position speakers that are carried with the rider and the recreational sport platform, but remote from the rider's ears so that the rider can participate in conversation with a companion. In another aspect, multiple speakers can be carried by the recreational sport platform and separated and spaced-apart from one another to provide fuller, multi-directional sound. For example, speakers can be positioned on opposite sides of the recreational sport platform to provide sound on both sides of the rider, and/or both front and rear of the rider. In another aspect, the speakers can be positioned to help with balance and to resist altering the performance characteristics of the recreational sport platform.

Referring to FIGS. 1-6, a sound system 10 is shown for outdoor sporting and can be utilized with a recreational sport platform, indicated generally at 14. The sound system 10 can comprise one or more speakers 18 carried by the recreational sport platform 14 and coupled to a flat surface 22 thereof. Thus, the speaker 18 can be positioned away from the rider's ears to allow for communication with a companion. In addition, the speaker 18 can be positioned to assist balance and performance characteristics of the recreational sport platform 14.

In one aspect, the speaker 18 can be coupled to the flat surface 22 of the recreational sport platform 14 without altering the flat surface 22 or the recreational sport platform 14. For example, the speaker 18 can be coupled without adding holes to the flat surface 22 of the recreational sport platform 14.

A mount 30 can be fixed to the flat surface 22 of the recreational sport platform 14 and exposed to ambient conditions. In one aspect, a single mount 30 can be used for a single speaker 18. In another aspect, a pair of mounts 30 can be used for a pair of speakers 18. For example, a forward mount 30 can be coupled at a forward position of the recreational sport platform 14, and a rearward mount 30 can be coupled at a rearward position of the recreational sport platform 14. In another aspect, four mounts 30 can be used with four speakers 18.

The mount 30 can comprise a base or mount plate 34. The mount plate 34 can have an inner surface or bottom 38 and a flat outer surface 42. The flat outer surface 42 can receive and abut to the speaker 18. In one aspect, the mount plate can be flat and rigid to provide support. A spacer plate 46 can be fixed to the bottom 38 of the mount plate 34. The spacer plate 46 can have an inner surface or bottom 50. In one aspect, the spacer plate 46 can be flat and rigid to provide support. In another aspect, the mount plate 34 and the spacer plate 46 can be formed of metal, such as aluminum, and can be formed by cutting or stamping from sheet material. In another aspect, the mount plate 34 and the spacer plate 46 each can be thin, e.g. a thickness less than ⅜ inch, to position the speaker 18 close to the recreational sport platform 14. In another aspect, an adhesive attachment layer 54 can be positioned between the mount plate 34 and the spacer plate 46 to affix the two plates 34 and 46 together. An interface between the two plates 34 and 46 can be solid an uninterrupted to provide the greatest surface for attachment. The adhesive attachment layer 54 can span an entire surface area of the interface for the greatest strength. Combining the two plates 34 and 46 can provide greater strength. In another aspect, the spacer plate 46 can have a length less than a length of the mount plate 34. Thus, the mount plate 34 can have opposite ends that can extend out in a cantilever fashion beyond the spacer plate 46. A pair of spaced-apart notches 58 can be formed at opposite ends of the mount plate 34 between the mount plate 34 and the flat surface 22 of the recreational sport platform 14.

Figure 2:
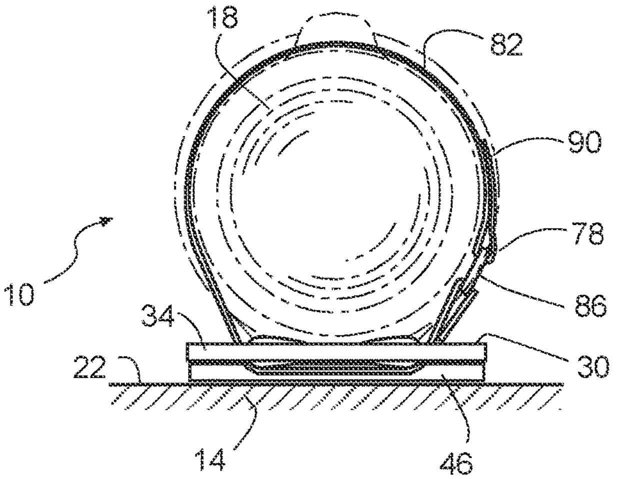
FIG. 2 is an end view of the personal, mobile sound system of FIG. 1.
Figure 3:
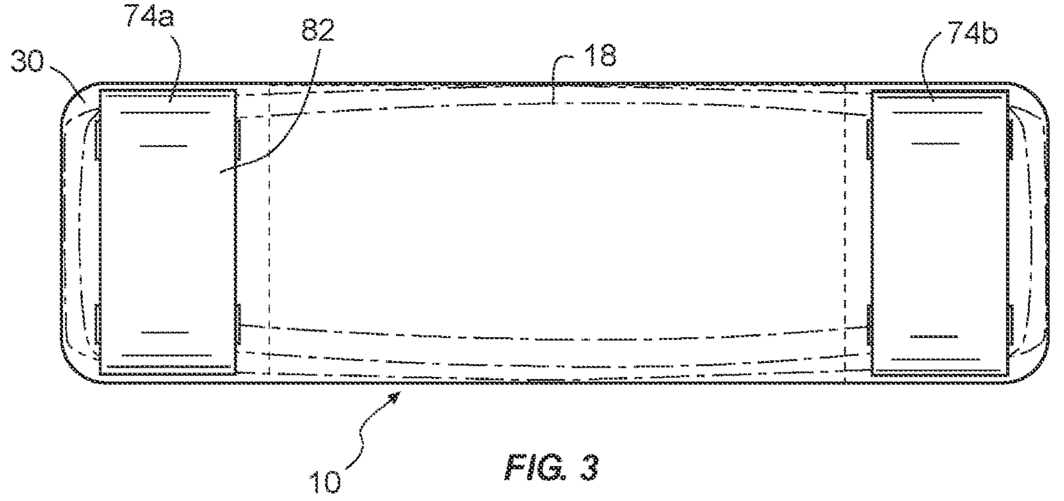
FIG. 3 is a top view of the personal, mobile sound system of FIG. 1.
Figure 4:
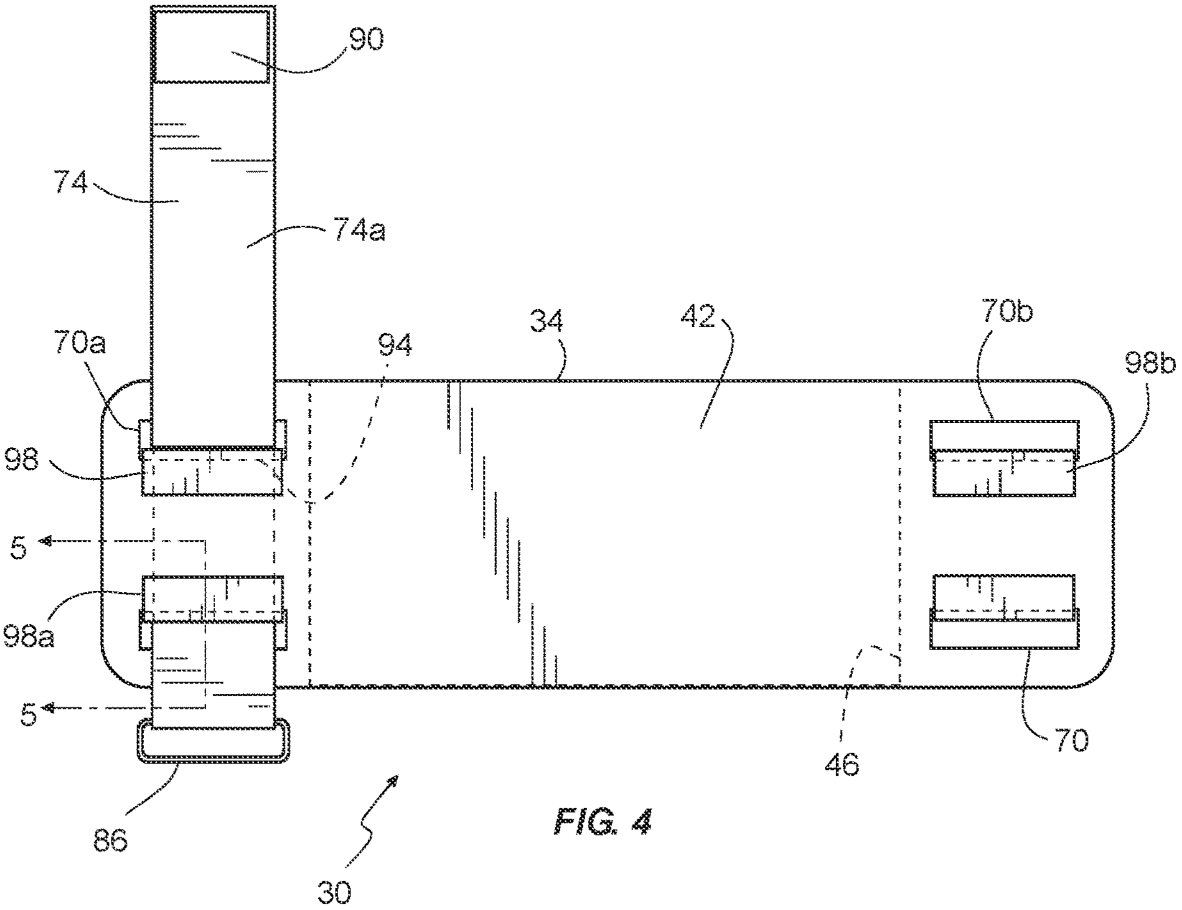
FIG. 4 is a top view an example of a mount of the personal, mobile sound system of FIG. 1, in accordance with one embodiment, shown with one strap in an open configuration and another strap removed for clarity.
Figure 5:
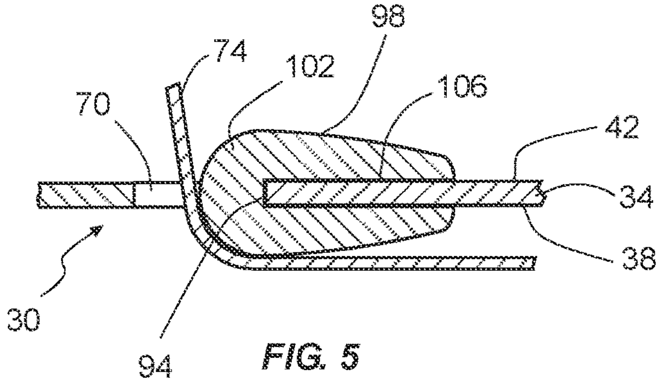
FIG. 5 is a partial, cross-sectional end view of the mount of the personal, mobile sound system of FIG. 1, taken along line 5 of FIG. 4.
Figure 6:
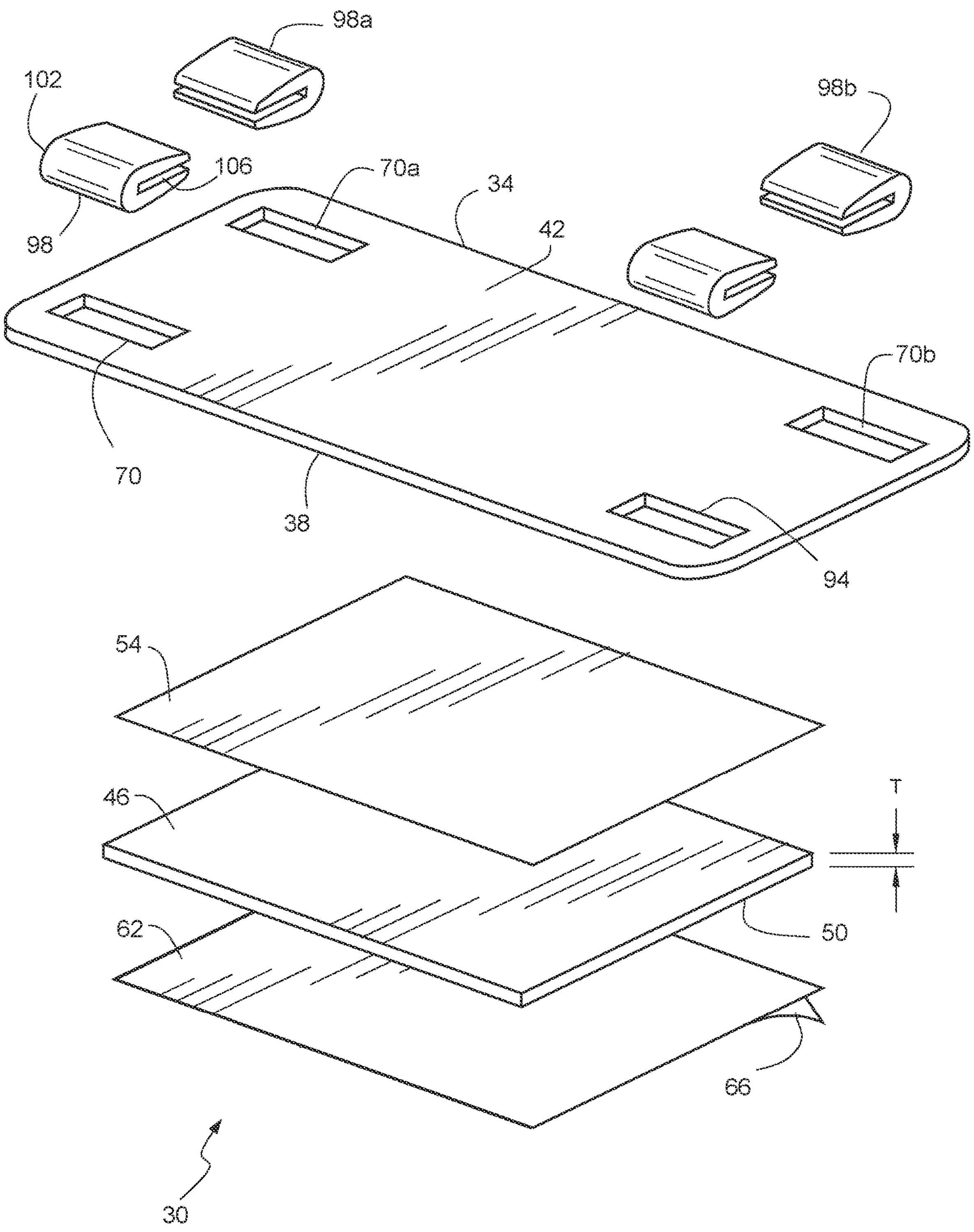
FIG. 6 is a partial exploded perspective view of the mount of the personal, mobile sound system of FIG. 1, shown with the straps removed for clarity.
Figure 7:
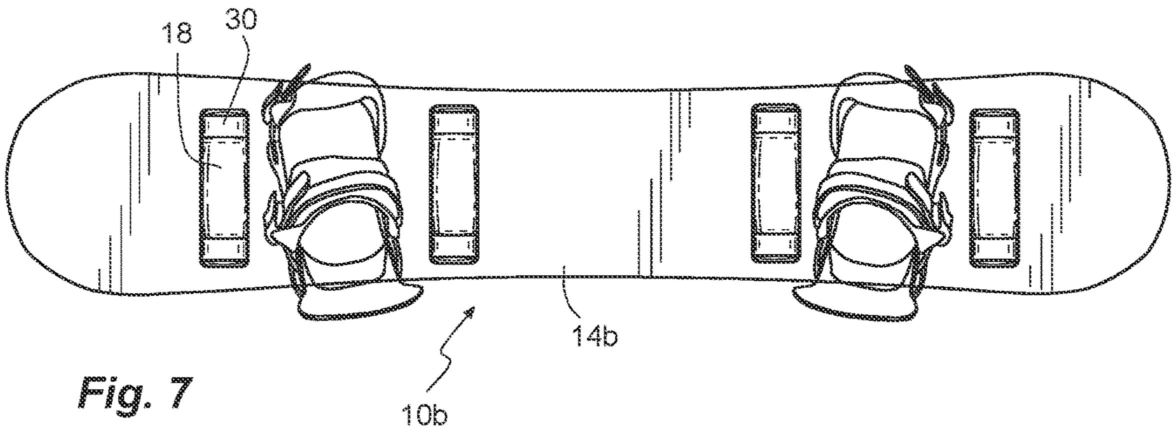
FIG. 7 is a top view of the personal, mobile sound system shown with four wireless speakers carried by a snowboard, in accordance with one embodiment.
Figure 8:
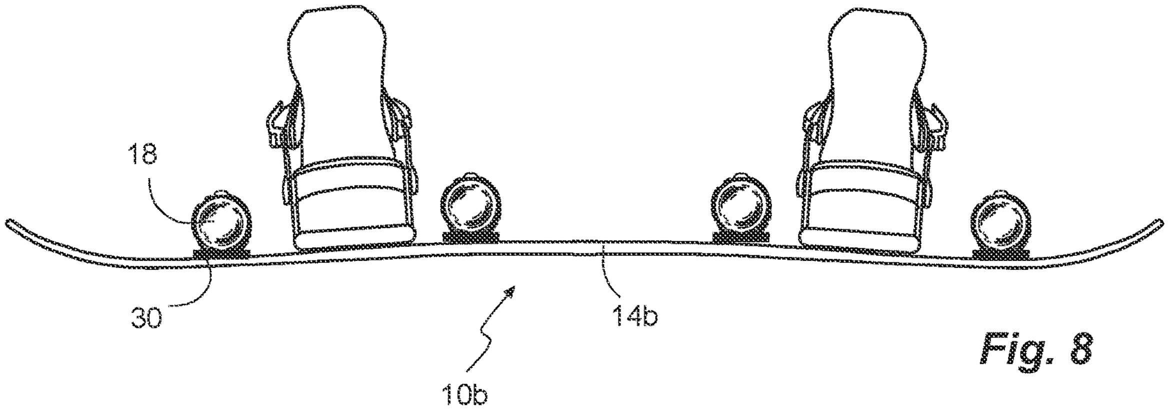
FIG. 8 is a side view of the personal, mobile sound system of FIG. 7.
Figure 9:
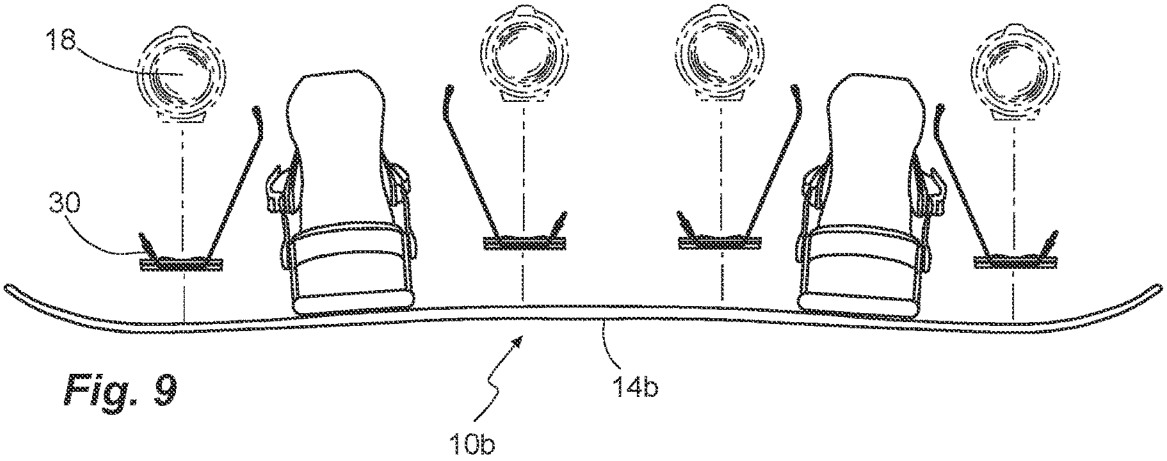
FIG. 9 is an exploded side view of the personal, mobile sound system of FIG. 7.
Figure 10:
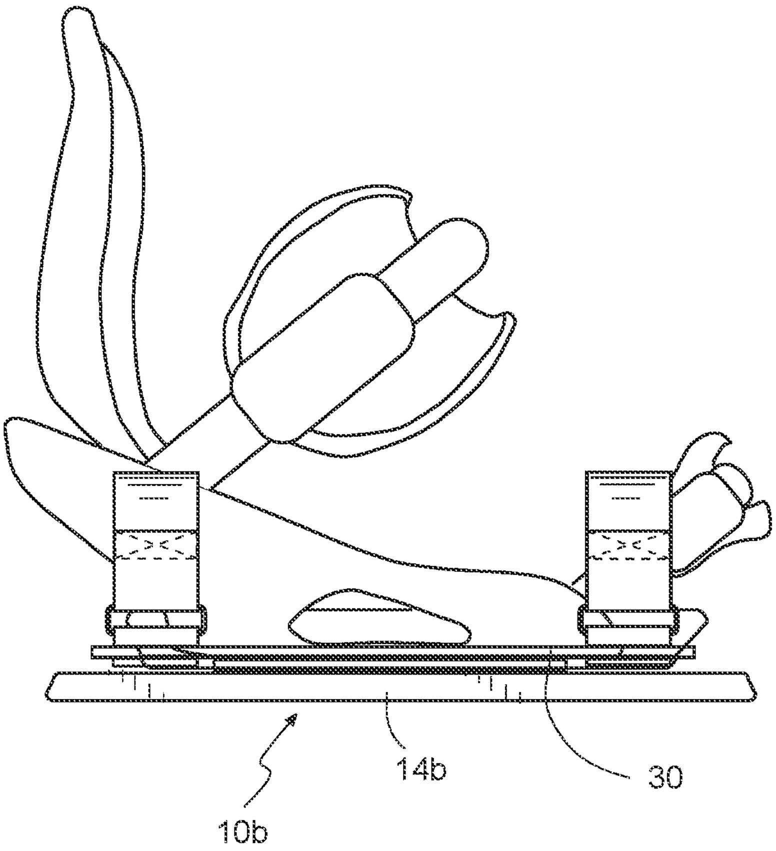
FIG. 10 is an end view of the personal, mobile sound system of FIG. 7.
Figure 11:
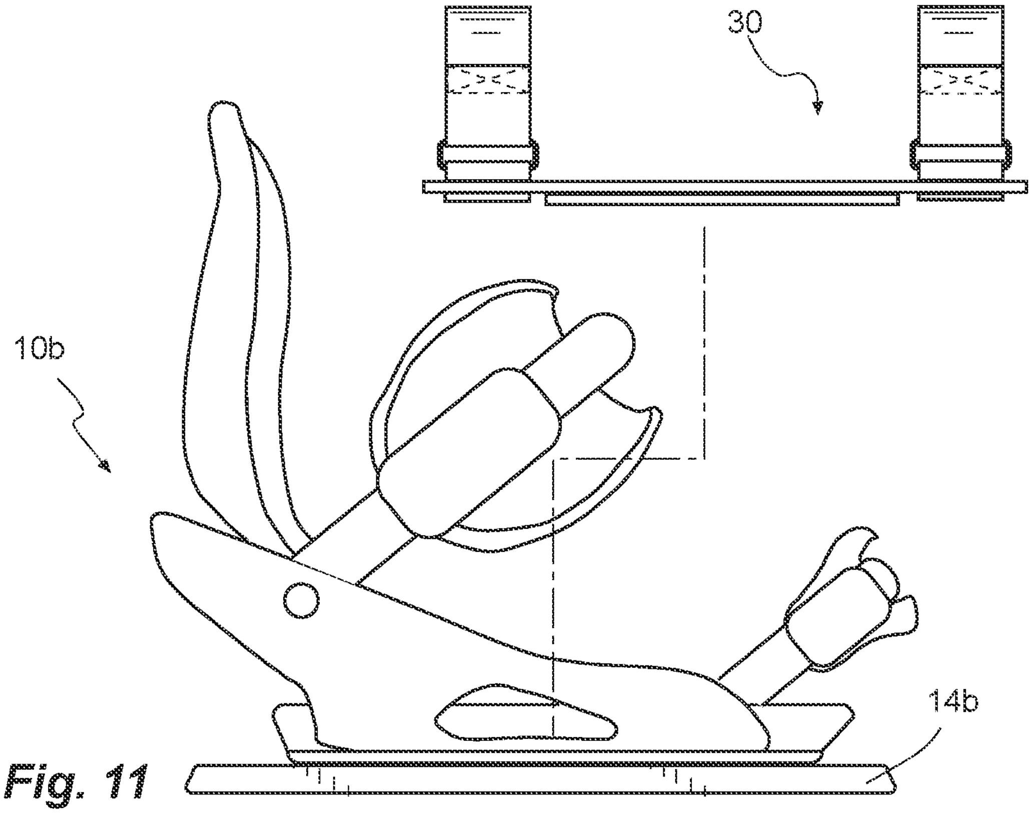
FIG. 11 is an exploded end view of the personal, mobile sound system of FIG. 7.

An adhesive mount layer 62 can be adhered on the bottom 50 of the spacer plate 46. The adhesive mount layer 62 can affix and adhere the spacer plate 46, and thus the mount plate 34 and the speaker 18, to the flat surface 22 of the recreational sport platform 14. In one aspect, a release liner 66 can be initially, removably coupled to and covering a bottom or exposed outer side of the adhesive mount layer 62. The mount 30 can have at least two configurations, including: an initial removed configuration (e.g. FIGS. 6, 9 and 11) and a subsequent mounted configuration (FIGS. 1 and 2). In the initial removed configuration, the release liner 66 can be coupled to the adhesive mount layer 62 (FIG. 6). In the subsequent mounted configuration, the release liner 66 can be removed with the adhesive mount layer 62 adhering the spacer plate 46, and thus the mount plate 34 and the speaker 18, to the flat surface 22 of the recreational sport platform 14.

The mount 30 can have slots 70 to receive straps 74. In one aspect, first and second pairs of slots 70*a* and 70*b* can be located at opposite ends of the mount plate 34 and outside a perimeter of the spacer plate 46. Thus, the slots 70 can be positioned at the notches 58. The slots can be elongated.

In another aspect, first and second straps 74*a* and 74*b* can be threaded through the first and second pairs of slots 70*a* and 70*b*, respectively. The straps 74 have fasteners 78 to form first and second releasably closable loops 82 around the speaker 18. The fasteners 78 can comprise a ring 86 coupled to one end of the strap 74. The opposite end of the strap 74 can be inserted through the ring 86 and doubled back on itself. The opposite end of the strap 74 can be releasably coupled to itself by hook-and-loop type fastener 90. In one aspect, the straps 74 can comprise nylon webbing. In another aspect, the straps 74 can be, or can comprise a section that is, elastic and resilient so that the straps 74 can apply a compressive force against the speaker 18 to hold the speaker to the mount plate 34.

The spacer plate 46 can have a thickness T (FIG. 6) creating a thickness of the pair of spaced-apart notches 58. The notches 58 can have a thickness T at least as great as a thickness of the straps 74. Thus, the straps 74 can be moved and adjusted through the notches 58 and the slots 70.

The slots 70 can have an interior edge 94 closer to an interior of the mount plate 34. Guards 98 can be positioned in the slots 70, and between the slots 70 or edges 94 and the straps 74. First and second pairs of guards 98*a* and 98*b* can be associated with the first and second pairs of slots 70*a* and 70*b*, respectively. The guards 98 can abut and cover a respective interior edge 94 of a respective slot 70. The guards 98 can space a respective strap 74 from the respective interior edge 94. In one aspect, the guards 98 can protect the straps 74 from the interior edges 94 of the slots 70. In addition, each guard 98 can have an asymmetric oblong profile with a thicker bulbous end 102 and thinner end. The thicker bulbous end 102 can be positioned in the slot 70 and at the interior edge 94. The thicker bulbous end 102 of the guard 98 can have an arcuate profile to guide the strap 74 through the slot 70 and around the interior edge 94. Each guard 98 can have a slit 106 in the profile to receive the interior edge 94 of the slot 70. In one aspect, the guards 98 can be formed of a compliant and resilient material, such as plastic, and can be formed by extrusion.

In another aspect, the mount 30 can have a cushion layer on the flat outer surface 42 of the mount plate 34 to provide a compliant interface between the speaker 18 and the mount 30 or the mount plate 34. In another aspect, the guards 98 can provide a cushion between the speaker 18 and the mount plate 34.

In use, the mount 30 can be affixed to the flat surface 22 of the recreational sport platform 14. The position of the mount 30 and the flat surface 22 can be selected to be outside a working area, e.g. where feet and hands engage, of the recreational sport platform 14. In one aspect, the release liner 66 can be removed from the adhesive mount layer 62; and the adhesive mount layer 62 can be affixed to the flat surface 22. The straps 74 can be opened and the speaker 18 can be placed against the flat outer surface 42, or the cushion layer or the guards 98, of the mount plate 34. The straps 74 can then be secured around the speaker 18 to secure the speaker 18 to the mount plate 34 of the mount 30. In another aspect, a free end of the strap 74 can be inserted through the ring 86 and doubled back on itself to secure the hook-and-loop type fastener 90. The speaker 18 can be operated to play music and the recreational sport platform 14 can be displaced or operated over terrain.

Referring to FIGS. 7-11, the personal, mobile sound system 10*b* can be used with downhill skiing and the recreational sport platform 14 can include a snowboard 14*b*. At least one speaker 18 can be coupled to the flat surface 22 of the snowboard 14*b*. In one aspect, positioning the speaker 18 at the snowboard 14*b* can separate the speaker 18 from the skier's ear to facilitate communication between companions. The speaker 18 can be positioned adjacent the binding. In another aspect, the speaker 18 can be positioned contiguous or contacting the binding. Positioning the speaker 18 adjacent the binding can position the added weight of the speaker 18 closest to the skier to resist interfering with balance. In addition, positioning the speaker 18 adjacent the binding can resist torque forces on the snowboard 14*b*. Thus, the position of the speaker 18 can resist altering the performance characteristics of the snowboard 14*b*. In another aspect, the speaker 18 can be positioned directly on and contacting the upper surface 34 of the snowboard 14. Positioning the speaker 18 on the snowboard 14 can keep the center of gravity lower. For example, positioning the speaker 18 at the binding can reduce torque on the snowboard 14*b*.

In one aspect, a single speaker 18 can be used. In another aspect, a pair of speakers 18 can be used. The speakers 18 can be located outside the pair of bindings, defining outer speakers. A forward outer speaker 18 can be located forward of the forward binding, and a rearward outer speaker 18 can be located rearward of the rearward binding. In addition, the speakers 18 can be located inside the pair of bindings, defining inner speakers. A forward inner speaker can be located rearward of the forward binding, and a rearward inner speaker can be located forward of the rearward binding. Using a pair of speakers 18 and positioning the speakers 18 spaced-apart near the bindings can provide sound to surround the skier and facilitate hearing as the skier's head and torso turn while snowboarding. In another aspect, four speakers 18 can be used, including the outer and inner speakers so that speakers are positioned on both sides of each binding. Utilizing four speakers 18 can insure continuous sound around the skier during maneuvering.

The speaker(s) 18 can be coupled to the snowboard 14*b* without altering the snowboard 14*b*. For example, the speaker(s) 18 can be coupled without adding holes to the snowboard 14*b*, and/or without fastening additional fasteners to the snowboard 14*b*.

Figure 12:
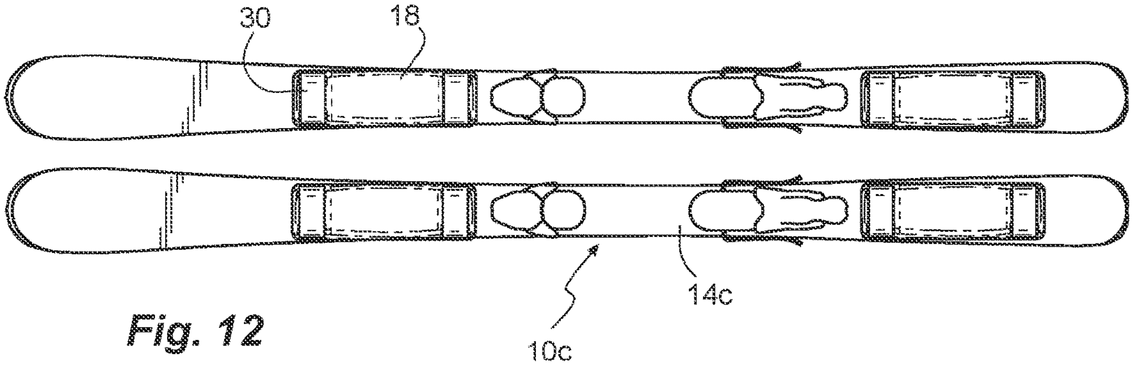
FIG. 12 is a top view of the personal, mobile sound system shown with four wireless speakers carried by a pair of snow skis, in accordance with one embodiment.
Figure 13:
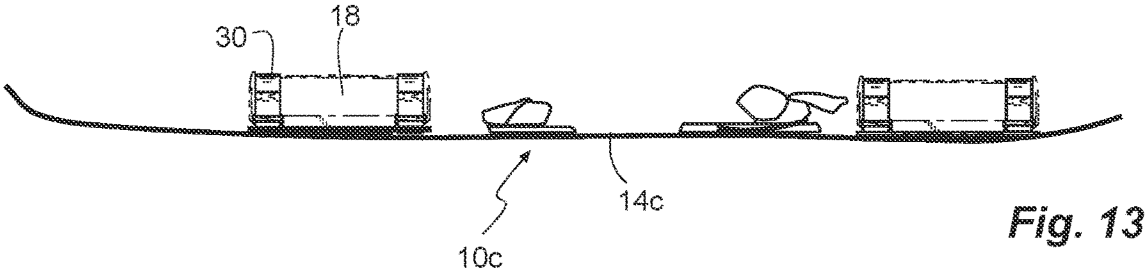
FIG. 13 is a side view of the personal, mobile sound system of FIG. 12.

Referring to FIGS. 12 and 13, the personal, mobile sound system 10*c* can be used with downhill skiing and the recreational sport platform 14 can include a pair of skis 14*c*. As with the snowboard 14*b*, the sound system 10*c* can include four speakers 18 with a pair of speakers 18 on both skies 14*c*. Each ski 14*c* can have a forward and outer speaker 18 forward of the binding, and a rearward and outer speaker 18 rearward of the binding.

Figure 14:
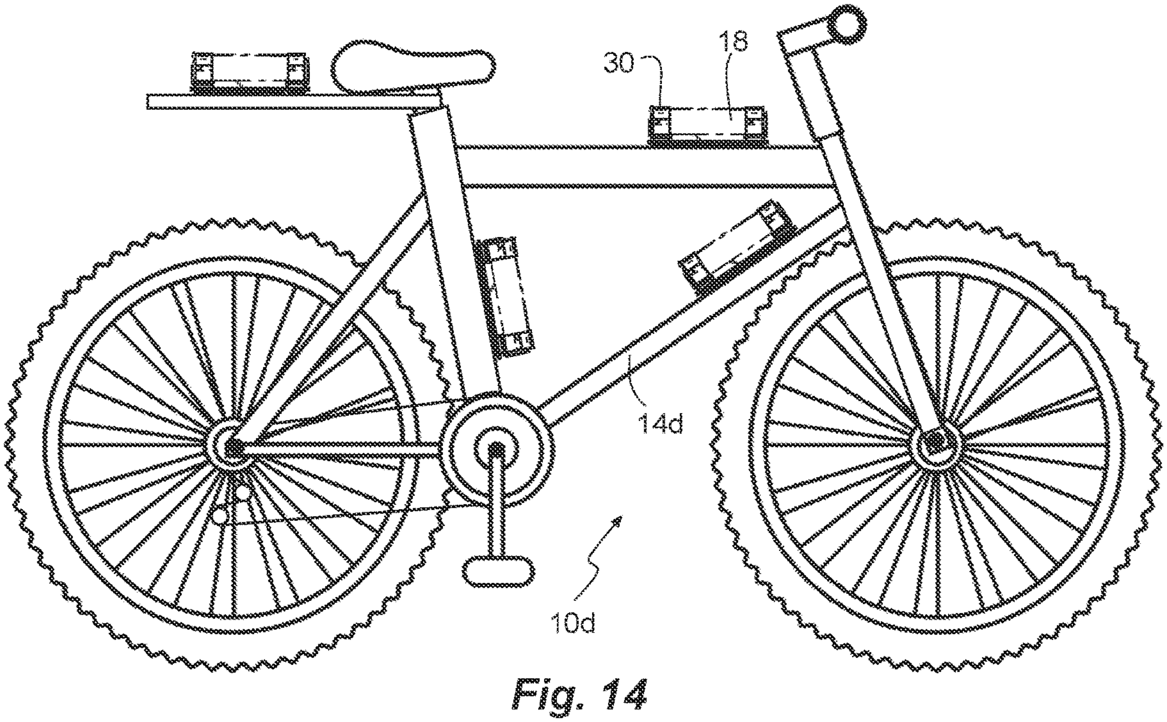
FIG. 14 is a side view of the personal, mobile sound system shown with four wireless speakers carried by a bicycle, in accordance with one embodiment.

Referring to FIG. 14, the personal, mobile sound system 10*d* can be used with cycling and/or mountain biking and the recreational sport platform 14 can include a bicycle or mountain bike 14*d*. The speaker 18 can be mounted to a flat surface 22 of the bike 14*d*, such as any straight surface, including the frame and/or a cargo platform. The speaker 18 and the mount 30 can be mounted horizontally, vertically or inclined.

Figure 15:
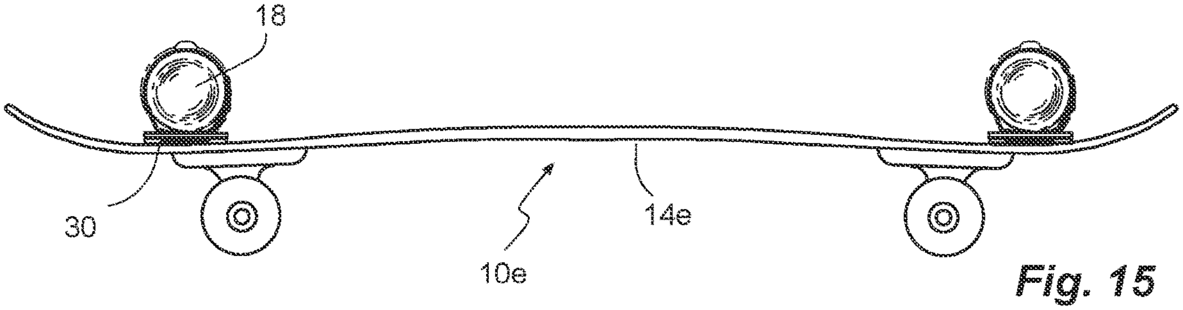
FIG. 15 is a side view of the personal, mobile sound system shown with two wireless speakers carried by a skate board or a longboard, in accordance with one embodiment.

Referring to FIG. 15, the personal, mobile sound system 10*e* can be used with skateboarding or longboarding and the recreational sport platform 14 can include a skateboard or longboard 14*e*. The speaker 18 and the mount 30 can be mounted to a deck of the board.

Figure 16:
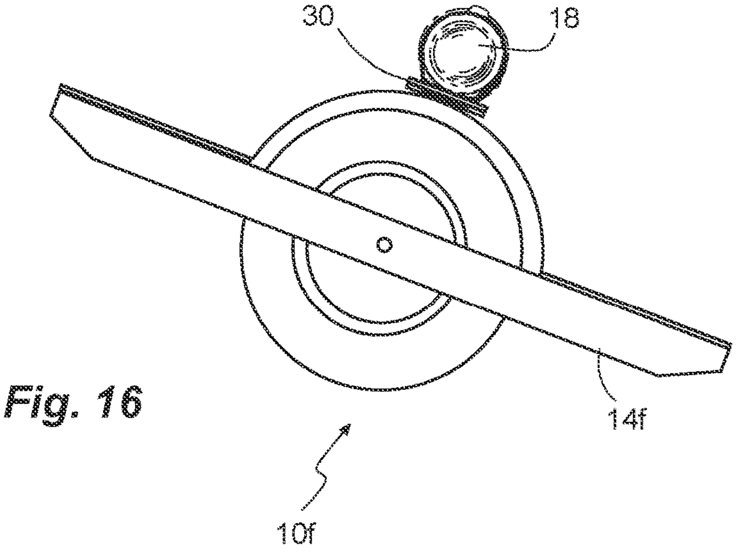
FIG. 16 is a side view of the personal, mobile sound system shown with a wireless speaker carried by a single wheel electric board-sport, recreational personal transporter, in accordance with one embodiment.

Referring to FIG. 16, the personal, mobile sound system 10*f* can be used with electric skateboarding and the recreational sport platform 14 can include a single wheel electric board-sport, recreational personal transporter 14*f*. The speaker 18 and the mount 30 can be mounted to a fairing or wheel guard, or a deck.

Figure 17:
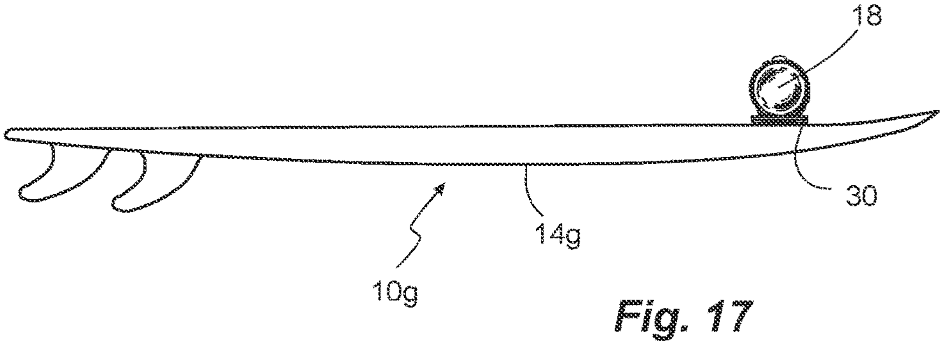
FIG. 17 is a side view of the personal, mobile sound system shown with a wireless speaker carried by a surfboard, in accordance with one embodiment

Referring to FIG. 17, the personal, mobile sound system 10*g* can be used with surfing and the recreational sport platform 14 can include a surfboard or boogie board 14*g*. The speaker 18 and the mount 30 can be mounted to a deck of the board.

Figure 18:
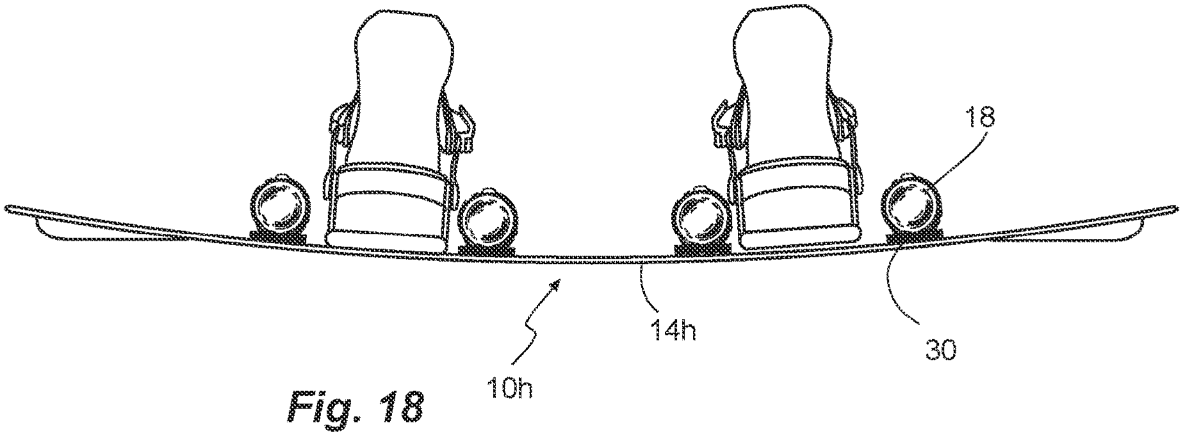
FIG. 18 is a side view of the personal, mobile sound system shown with four wireless speakers carried by a wakeboard, in accordance with one embodiment.

Referring to FIG. 18, the personal, mobile sound system 10*h* can be used with wakeboarding, knee boarding and waterskiing and the recreational sport platform 14 can include a wakeboard 14*h*, kneeboard or waterski. The speaker 18 and the mount 30 can be mounted to a top surface of the board.

In another aspect, the personal, mobile sound system 10 can be used with off-roading or ATVing and the recreational sport platform 14 can include an all-terrain vehicle (ATV), a utility terrain vehicle (UTV), a side-by-side vehicle, etc.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order.

It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A personal, mobile sound system comprising:
- a) a personal, mobile, outdoor, recreational sport platform capable of transporting a rider and having a flat surface;
- b) a mount fixed to the flat surface of the recreational sport platform and exposed to ambient conditions, the mount comprising:
  - i) a mount plate with a bottom and a flat outer surface;
  - ii) a spacer plate fixed to the bottom of the mount plate and having a bottom;
  - iii) an adhesive mount layer on the bottom of the spacer plate and adhering the spacer plate and the mount plate to the flat surface of the recreational sport platform;
  - iv) first and second pairs of slots located at opposite ends of the mount plate and outside a perimeter of the spacer plate;

v) first and second straps threaded through the first and second pairs of slots, respectively, the first and second straps having fasteners to form first and second releasably closable loops;

vi) the spacer plate having a length less than a length of the mount plate forming a pair of spaced-apart notches at opposite ends of the mount plate between the mount plate and the flat surface of the recreational sport platform; and vii) the spacer plate having a thickness creating a thickness of the pair of spaced-apart notches at least as great as a thickness of the first and second straps; and c) a self-powered, wireless speaker releasably coupled to the mount and the recreational sport platform by the first and second straps.

2. The system in accordance with claim 1, further comprising:

the first and second pairs of slots having interior edges;

first and second pairs of guards associated with the first and second pairs of slots; and each guard abutting a respective interior edge of a respective slot and spacing a respective strap from the respective interior edge.

3. The system in accordance with claim 1, wherein:

each guard has an asymmetric oblong profile with a thicker end and thinner end; and each guard having a slit in the profile receiving an interior edge of a slot.

4. The system in accordance with claim 1, wherein:

the mount plate and the spacer plate each have a thickness less than ⅜ inch.

5. The system in accordance with claim 1, further comprising:

an adhesive attachment layer between the mount plate and the spacer plate.

6. The system in accordance with claim 1, further comprising:

a release liner removably coupled to and covering the adhesive mount layer; and the mount having at least two configurations, including:

an initial removed configuration with the release liner coupled to the adhesive mount layer; and a subsequent mounted configuration with the release liner removed and the adhesive mount layer adhering the spacer plate and the mount plate to the flat surface of the recreational sport platform.

7. A mount configured for a personal, mobile sound system with a self-powered, wireless speaker and a personal, mobile, outdoor, recreational sport platform, the mount comprising:

a) a mount plate with a bottom and a flat outer surface;

b) a spacer plate fixed to a bottom of the mount plate and having a bottom;

c) an adhesive mount layer on the bottom of the spacer plate and configured to adhere the spacer plate and the mount plate to the flat surface of the recreational sport platform;

d) first and second pairs of slots located at opposite ends of the mount plate and outside a perimeter of the spacer plate;

e) first and second straps threaded through the first and second pairs of slots, respectively, the first and second straps having fasteners to form first and second releasably closable loops;

f) the spacer plate having a length less than a length of the mount plate forming a pair of spaced-apart notches at opposite ends of the mount plate; and g) the spacer plate having a thickness creating a thickness of the pair of spaced-apart notches at least as great as a thickness of the first and second straps.

8. The mount in accordance with claim 7, further comprising:

the first and second pairs of slots having interior edges;

first and second pairs of guards associated with the first and second pairs of slots; and each guard abutting a respective interior edge of a respective slot and spacing a respective strap from the respective interior edge.

9. The mount in accordance with claim 8, wherein:

each guard has an asymmetric oblong profile with a thicker end and thinner end; and each guard having a slit in the profile receiving an interior edge of a slot.

10. The mount in accordance with claim 8, wherein:

each guard extends only along an interior edge of the slot.

11. The mount in accordance with claim 7, further comprising:

an adhesive attachment layer between the mount plate and the spacer plate.

12. The mount in accordance with claim 7, further comprising:

a release liner removably coupled to and covering the adhesive mount layer; and the mount having at least two configurations, including:

an initial removed configuration with the release liner coupled to the adhesive mount layer; and a subsequent mounted configuration with the release liner removed and the adhesive mount layer adhering the spacer plate and the mount plate to the flat surface of the recreational sport platform.

13. The mount in accordance with claim 7, further in combination with a self-powered, wireless speaker releasably coupled to the mount by the first and second straps.

14. The mount in accordance with claim 13, further in combination with a personal, mobile, outdoor, recreational sport platform with a flat surface.

15. A mount configured for a personal, mobile sound system with a self-powered, wireless speaker and a personal, mobile, outdoor, recreational sport platform, the mount comprising:

a) a mount plate with a bottom and a flat outer surface;

b) a spacer plate fixed to a bottom of the mount plate and having a bottom;

c) an adhesive mount layer on the bottom of the spacer plate and configured to adhere the spacer plate and the mount plate to the flat surface of the recreational sport platform;

d) first and second pairs of slots located at opposite ends of the mount plate and outside a perimeter of the spacer plate;

e) the first and second pairs of slots having interior edges;

f) first and second straps threaded through the first and second pairs of slots, respectively, the first and second straps having fasteners to form first and second releasably closable loops;

g) first and second pairs of guards associated with the first and second pairs of slots, each guard abutting a respective interior edge of a respective slot and spacing a respective strap from the respective interior edge;

h) the spacer plate having a length less than a length of the mount plate forming a pair of spaced-apart notches at opposite ends of the mount plate; and i) the spacer plate having a thickness creating a thickness of the pair of spaced-apart notches at least as great as a thickness of the first and second straps.

16. The mount in accordance with claim 15, wherein:

each guard has an asymmetric oblong profile with a thicker end and thinner end; and each guard having a slit in the profile receiving an interior edge of a slot.

17. The mount in accordance with claim 15, further comprising:

an adhesive attachment layer between the mount plate and the spacer plate.

18. The mount in accordance with claim 15, further comprising:

a release liner removably coupled to and covering the adhesive mount layer; and the mount having at least two configurations, including:

an initial removed configuration with the release liner coupled to the adhesive mount layer; and a subsequent mounted configuration with the release liner removed and the adhesive mount layer adhering the spacer plate and the mount plate to the flat surface of the recreational sport platform.

19. The mount in accordance with claim 15, further in combination with a self-powered, wireless speaker releasably coupled to the mount by the first and second straps.

20. The mount in accordance with claim 19, further in combination with a personal, mobile, outdoor, recreational sport platform with a flat surface.

* * * * *